(12) United States Patent
Sung et al.

(10) Patent No.: US 11,557,750 B2
(45) Date of Patent: Jan. 17, 2023

(54) ELECTRODE FOR SOLID-STATE BATTERY AND MANUFACTURING METHOD THEREFOR

(71) Applicant: LG CHEM, LTD., Seoul (KR)

(72) Inventors: Da Young Sung, Daejeon (KR); Se Ho Park, Daejeon (KR); Minchul Jang, Daejeon (KR); Suk Il Youn, Daejeon (KR); Byoungkuk Son, Daejeon (KR); Eunkyung Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 255 days.

(21) Appl. No.: 16/636,442

(22) PCT Filed: Aug. 17, 2018

(86) PCT No.: PCT/KR2018/009444
§ 371 (c)(1),
(2) Date: Feb. 4, 2020

(87) PCT Pub. No.: WO2019/035681
PCT Pub. Date: Feb. 21, 2019

(65) Prior Publication Data
US 2020/0321598 A1 Oct. 8, 2020

(30) Foreign Application Priority Data

Aug. 17, 2017 (KR) .................. 10-2017-0104264
Aug. 17, 2018 (KR) .................. 10-2018-0095862

(51) Int. Cl.
*H01M 4/04* (2006.01)
*H01M 4/13915* (2010.01)
(Continued)

(52) U.S. Cl.
CPC ....... *H01M 4/0404* (2013.01); *H01M 4/1393* (2013.01); *H01M 4/13915* (2013.01);
(Continued)

(58) Field of Classification Search
CPC .......... H01M 4/0404; H01M 4/13915; H01M 4/1393; H01M 4/621; H01M 10/0562; H01M 2004/027; H01M 2004/028
See application file for complete search history.

(56) References Cited

U.S. PATENT DOCUMENTS 9,246,188 B2    1/2016  Zhao et al.
2004/0170898 A1 9/2004  Shibuya et al.
(Continued)

FOREIGN PATENT DOCUMENTS

CN    106252591 A    12/2016
JP    9-134730 A     5/1997
(Continued)

OTHER PUBLICATIONS

Machine Translation of Takuhiro (Year: 2014).*
(Continued)

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

A method for manufacturing an electrode for an all solid battery including the steps of coating a current collector with a slurry including an active material, a conductive material, and a polyimide-based binder; and melting a solid electrolyte having a melting temperature of 50° C. to 500° C. and applying it onto the coating layer and an electrode manufactured therefrom.

14 Claims, 2 Drawing Sheets

(51) Int. Cl.
H01M 4/1393 (2010.01)
H01M 4/62 (2006.01)
H01M 10/0562 (2010.01)
H01M 4/02 (2006.01)

(52) U.S. Cl.
CPC ....... H01M 4/622 (2013.01); H01M 10/0562 (2013.01); *H01M 2004/027* (2013.01); *H01M 2004/028* (2013.01)

(56) References Cited

U.S. PATENT DOCUMENTS

| | | | |
|---|---|---|---|
| 2014/0308571 | A1 | 10/2014 | Gaben et al. |
| 2014/0308581 | A1 | 10/2014 | Yao et al. |
| 2015/0221979 | A1 | 8/2015 | Teraoka et al. |
| 2016/0028103 | A1 | 1/2016 | Yokoyama et al. |
| 2016/0359190 | A1 | 12/2016 | Teraoka et al. |
| 2016/0365602 | A1 | 12/2016 | Sousa Soares De Oliveira Braga |
| 2017/0025705 | A1 | 1/2017 | Miara et al. |
| 2017/0179472 | A1 | 6/2017 | Allie et al. |
| 2018/0277889 | A1* | 9/2018 | Anandan ............. H01M 10/052 |
| 2019/0036107 | A1 | 1/2019 | Nagano |

FOREIGN PATENT DOCUMENTS

| | | |
|---|---|---|
| JP | 2002-157998 A | 5/2002 |
| JP | 2003-323895 A | 11/2003 |
| JP | 2004-362859 A | 12/2004 |
| JP | 2005-78985 A | 3/2005 |
| JP | 2014-96311 A | 5/2014 |
| JP | 2015-144061 A | 8/2015 |
| JP | 2016-25020 A | 2/2016 |
| JP | 2016-514897 A | 5/2016 |
| JP | 2017-135005 A | 8/2017 |
| KR | 10-2014-0096334 A | 8/2014 |
| KR | 10-2016-0142293 A | 12/2016 |
| KR | 10-2017-0012042 A | 2/2017 |
| WO | WO 2016/035713 A1 | 3/2016 |

OTHER PUBLICATIONS

Dielectric Manufacturing—Kapton data sheet (https://dielectricmfg.com/knowledge-base/kapton/) (Year: 2019).*
Wu et al., "Flexible and Binder-Free Organic Cathode for High-Performance Lithium-Ion Batteries," Advanced Materials, vol. 26, No. 20, 2014, pp. 3338-3343.
Extended European Search Report dated Jul. 8, 2020 for Application No. 18846958.9.
Choi et al., "Enhanced Electrochemical Properties of a Si-based Anode Using an Electrochemically Active Polyamide Imide Binder", Journal of Power Sources, 2008, vol. 177, No. 2, pp. 590-594, See abstract and figures 1, 4.
International Search Report (PCT/ISA/210) issued in PCT/KR2018/009444, dated Mar. 8, 2019.
Morishita et al., "Polyamide-Imide Binder with Higher Adhesive Property and Thermal Stability as Positive Electrode of 4V-Class Lithium-Ion Batteries", Journal of The Electrochemical Society, 2014, vol. 161, No. 6, pp. A955-A960, See abstract.
Zhao et al., "Superionic Conductivity in Lithium-Rich Anti-Perovskites", Journal of the American Chemical Society, 2012, vol. 134, No. 36, pp. 15042-15047. See abstract and p. 15044.

* cited by examiner

【Figure 1】
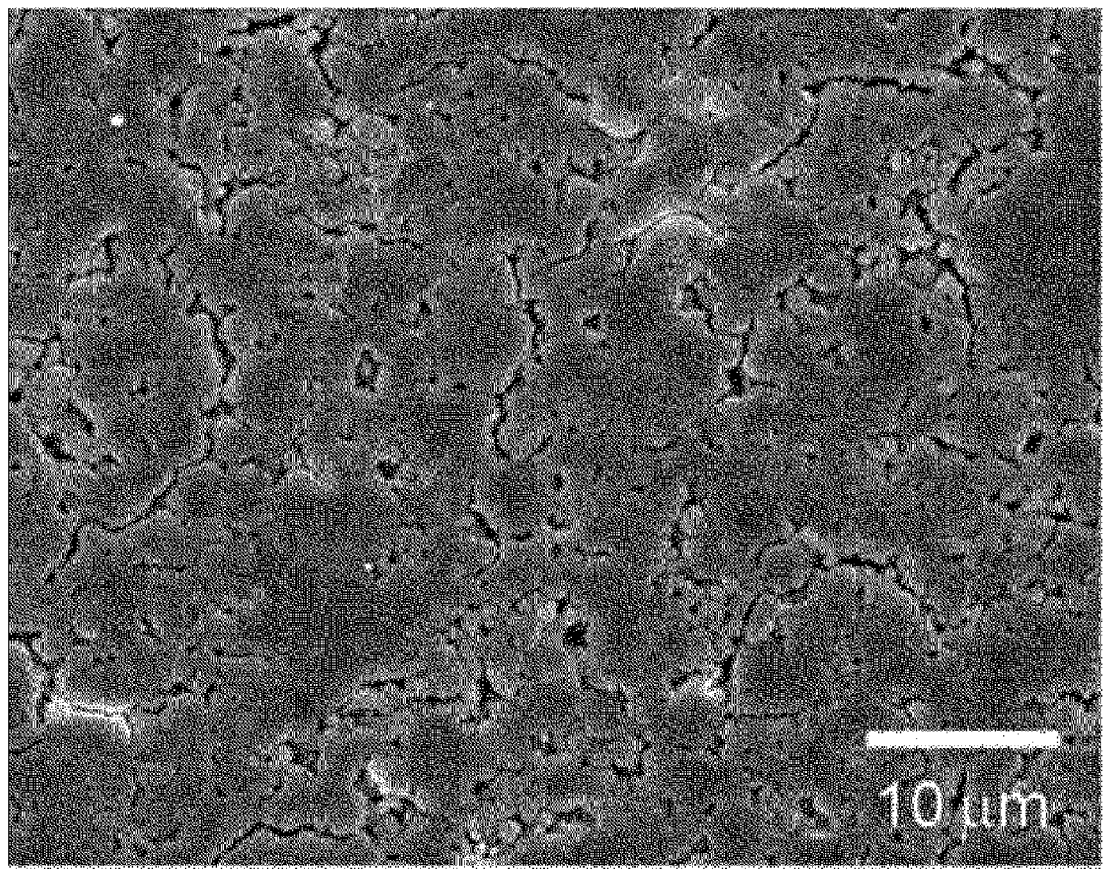
【Figure 2】
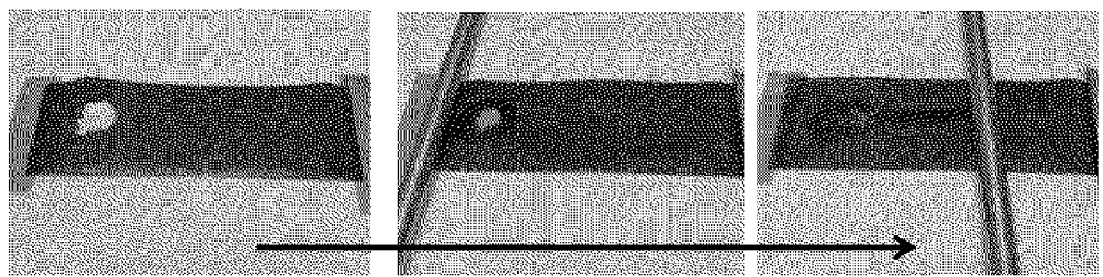

【Figure 3】
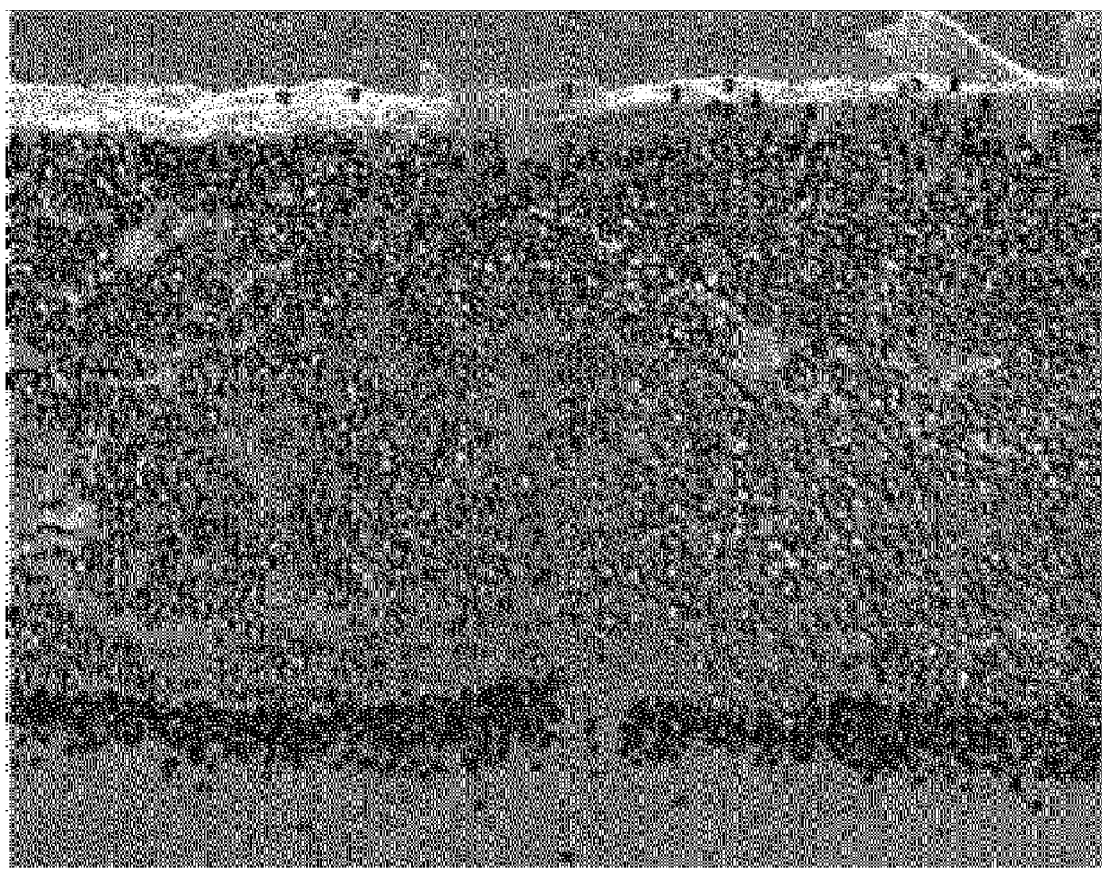

ELECTRODE FOR SOLID-STATE BATTERY AND MANUFACTURING METHOD THEREFOR

TECHNICAL FIELD

This application claims priority to Korean Patent Application No. 10-2017-0104264, filed Aug. 17, 2017 and Korean Patent Application No. 10-2018-0095862, filed Aug. 17, 2018, the disclosures of which are incorporated herein by reference.

The present invention relates to an electrode for an all solid battery and a method for manufacturing the same.

BACKGROUND ART

From the viewpoints of capacity, safety, power output, enlargement, miniaturization and the like of the battery, various batteries that can overcome the limitations of lithium secondary batteries are currently being studied.

Representatively, a metal-air battery, which has very large theoretical capacity compared to the lithium secondary battery, in terms of capacity, an all solid battery with no risk of explosion in terms of safety, a supercapacitor in terms of output, a NaS battery or RFB (redox flow battery) in terms of enlargement, a thin film battery in terms of miniaturization, etc., are continuous studied in academia and industry.

Among these, the all solid battery is a battery in which a liquid electrolyte used in a conventional lithium secondary battery is replaced with a solid electrolyte, and the all solid battery can significantly improve safety since a flammable solvent is not used in the battery and thus the ignition or explosion due to the decomposition reaction of the conventional electrolyte solution is not occurred. In addition, there is an advantage that since Li metal or Li alloy can be used as the material of the negative electrode, the energy density with respect to the mass and volume of the battery can be remarkably improved.

There are roughly two methods that can be used in manufacturing the all solid battery.

First, there is a method of pressurizing after dry-mixing. Specifically, after adding the solid electrolyte powder to the active material powder and conductive material powder and then dry-mixing, the electrode composite powder is pressurized onto the current collector to form the electrode.

In addition, there is a method to pressurize after wet-mixing. Specifically, after wet-mixing the active material powder and the conductive material powder with the solid electrolyte powder and the binder solution, the electrode material is coated on the current collector in the form of a slurry, dried and pressurized to form the electrode.

Among them, in the case of the dry-mixing method, there is a disadvantage that the interfacial resistance between the current collector/electrode/electrolyte is high and the control of the pores in the electrode is difficult and there is also a disadvantage that the contact between the electrode material and the electrolyte is not maintained because there is no binder.

In addition, in the case of the wet-mixing method, there are disadvantages that it is difficult to apply the binder and the solvent used in the conventional secondary battery process, and when the solvent is vaporized, the pores are generated in the electrode and thus the resistance in the electrode/electrolyte is increased.

Additionally, in both of the above methods, the three kinds of electrode materials of active material, electrolyte, and conductive material must be evenly dispersed, but there is a high possibility that the particles are not well dispersed and thus there is a disadvantage that the resistance of the electrode is large. Further, there is a disadvantage that all of the three materials are contacted by a point contact, and thus the contact resistance is large.

PATENT LITERATURE (Patent Literature 1) Japanese Patent Application Laid-Open No. 2016-025020, "ELECTRODE COMPLEX, LITHIUM BATTERY, AND ELECTRODE COMPLEX MANUFACTURING METHOD"

DISCLOSURE

Technical Problem

In order to solve the above problems, the inventors of the present invention have conducted various studies and, as a result, have manufactured an electrode for all solid battery by using a solid electrolyte having characteristics of being melted at a low temperature and a high heat-resisting binder. Through this, the solid electrolyte can be melted and impregnated into the pores in the electrode, so that the electron and ion transport pathways can be well formed. In addition, when the solid electrolyte is melted and impregnated into the pores in the electrode, since the solid electrolyte can be brought into contact with the surface of the active material in a wetting manner, the bonding property of the active material/solid electrolyte is good and the interfacial resistance is reduced. Also, since there is no step of drying a solvent in the manufacturing process, the pores in the electrode are not additionally generated, and the resistance due to the pores is reduced.

Therefore, it is an object of the present invention to provide an electrode for all solid battery in which electron and ion transfer pathways are well formed by using a solid electrolyte having characteristics of being melted at a low temperature and a high heat-resisting binder, the bonding property of the active material/the solid electrolyte is good, the interfacial resistance between the active material/the solid electrolyte is small, and also the pores in the electrode are not additionally generated during the manufacture of the electrode, and a method for manufacturing the same.

Technical Solution

In order to achieve the above object, the present invention provides a method for manufacturing an electrode for an all solid battery comprising the steps of (a) coating a current collector with a slurry comprising an active material, a conductive material, and a polyimide-based high heat-resisting binder; and (b) placing a solid electrolyte having a melting temperature of 50° C. to 500° C. on the coating layer, followed by heating/melting it.

In addition, the present invention provides an electrode for an all solid battery including a current collector; a coating layer formed on the current collector, which includes an active material, a conductive material, and a polyimide-based high heat-resisting binder; and a solid electrolyte having a melting temperature of 50° C. to 500° C. formed on the coating layer.

Advantageous Effects

The electrode for all solid battery and its manufacturing method according to the present invention show an effect of forming electron and ion transfer pathways well by manufacturing the electrode for all solid battery using a solid electrolyte having characteristics of being melted at a low temperature and a high heat-resisting binder, thereby melting the solid electrolyte and impregnated it into the pores of the electrode. Also, when the solid electrolyte is melted and impregnated into the pores in the electrode, since the solid electrolyte can be brought into contact with the surface of the active material in a wetting manner, the bonding property of the active material/solid electrolyte is good and the interfacial resistance is reduced. In addition, since there is no step of drying a solvent in the manufacturing process, the pores in the electrode are not additionally generated, and the resistance due to the pores is reduced.

DESCRIPTION OF DRAWINGS

FIG. 1 is a SEM photograph of an electrode for an all solid battery manufactured by a conventional technique.

FIG. 2 is a photograph of a manufacturing process of an electrode for an all solid battery of the present invention.

FIG. 3 is a SEM photograph of an electrode for an all solid battery manufactured according to the first embodiment of the present invention.

BEST MODE

Hereinafter, the present invention will now be described more fully with reference to the accompanying drawings, in order that the present invention can be easily carried out by those skilled in the art. However, the present invention may be embodied in many different forms and should not be construed as limited to the embodiments set forth herein.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

FIG. 1 is a photograph of a surface of an electrode for an all solid battery manufactured by a conventional manufacturing method. As an conventional manufacturing method, there were a dry manufacturing method of forming an electrode by adding the solid electrolyte powder to the active material powder and the conductive material powder and dry-mixing them, and then pressurizing the electrode composite powder onto the current collector, and a wet manufacturing method of forming an electrode by adding the solid electrolyte powder and the binder solution to the active material powder and the conductive material powder, wet-mixing them, and then coating the electrode material on the current collector in the form of a slurry, dried and pressurized to form the electrode. In the case of the dry manufacturing method, it is difficult to control the pores in the electrode because of the use of the solid electrolyte powder, and in the case of the wet manufacturing method, pores are generated as the solvent is vaporized in the manufacturing process. Accordingly, according to the conventional manufacturing methods, many pores are generated in the electrode in both the dry manufacturing method and the wet manufacturing method, as shown in FIG. 1.

In order to solve the above problems, the inventors of the present invention have conducted various studies, and as a result, have come up with manufacture of an electrode for all solid battery which solves the above problems by using a solid electrolyte having characteristics of being melted at a low temperature and a high heat-resisting binder.

For this purpose, the method for manufacturing the electrode for the all solid battery of the present invention comprises the steps of: (a) coating a current collector with a slurry comprising an active material, a conductive material, and a polyimide-based high heat-resisting binder; and (b) placing a solid electrolyte having a melting temperature of 50° C. to 500° C. on the coating layer, followed by heating/melting it.

First, the method for manufacturing the electrode for the all solid battery of the present invention includes the step of: (a) coating the current collector with the slurry comprising the active material, the conductive material, and the polyimide-based high heat-resisting binder In step (a), the slurry includes the active material, the conductive material, and the polyimide-based high heat-resisting binder.

When the electrode proposed in the present invention is a positive electrode, the active material may be a positive electrode active material, and when the electrode is a negative electrode, the active material may be a negative electrode active material. At this time, each of the electrode active materials can be any active material which is applied to conventional electrodes, and is not particularly limited in the present invention.

In addition, the positive electrode active material may vary depending on the use of the lithium secondary battery, and a known material is used with regard to the specific composition. For example, the positive electrode active material may be any one lithium transition metal oxide selected from the group consisting of lithium cobalt based oxide, lithium manganese based oxide, lithium copper based oxide, lithium nickel based oxide and lithium manganese composite oxide, and lithium-nickel-manganese-cobalt based oxide, and more particularly may be, but is not limited to, $Li_{1+x}Mn_{2-x}O_4$ (wherein x is 0 to 0.33), lithium manganese oxides such as $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, $Cu_2V_2O_7$; lithium nickel oxides represented by $LiNi_{1-x}M_xO_2$ (wherein M=Co, Mn, Al, Cu, Fe, Mg, B or Ga, and x=0.01 to 0.3); lithium manganese composite oxide represented by $LiMn_{2-x}M_xO_2$ (wherein M=Co, Ni, Fe, Cr, Zn or Ta, and x=0.01 to 0.1) or $Li_2Mn_3MO_8$ (wherein M=Fe, Co, Ni, Cu or Zn), lithium-nickel-manganese-cobalt based oxide represented by $Li(Ni_aCo_bMn_c)O_2$ (wherein $0<a<1$, $0<b<1$, $0<c<1$, a+b+c=1), $Fe_2(MoO_4)_3$; sulfur element, disulfide compound, organosulfur compound and carbon-sulfur polymer ($(C_2S_x)_n$: x=2.5 to 50, n≥2), carbon-sulfur composite; graphite-based materials; carbon black-based materials such as Super-P, Denka black, acetylene black, Ketjen black, channel black, furnace black, lamp black, thermal black and carbon black; carbon derivatives such as fullerene; electrically conductive fibers such as carbon fiber or metal fiber; carbon fluoride, aluminum and metal powders such as nickel powder; and electrically conductive polymers such as polyaniline, polythiophene, polyacetylene, and polypyrrole; forms produced by carrying catalysts such as Pt or Ru to the porous carbon support.

In addition, the negative electrode active material may be any one selected from the group consisting of lithium metal, a lithium alloy, a lithium metal composite oxide, a lithium-containing titanium composite oxide (LTO), and a combination thereof. In this case, the lithium alloy may be an alloy of lithium and at least one metal selected from Na, K, Rb, Cs, Fr, Be, Mg, Ca, Sr, Ba, Ra, Al and Sn. Also, the lithium metal composite oxide is lithium and an oxide ($MeO_x$) of any one metal (Me) selected from the group consisting of Si, Sn, Zn, Mg, Cd, Ce, Ni and Fe and for example, may be $Li_xFe_2O_3$ ($0<x≤1$) or $Li_xWO_2$ ($0<x≤1$).

In addition, the negative electrode active material may be metal composite oxides such as $Sn_xMe_{1-x}Me'_yO_z$ (Me: Mn, Fe, Pb, Ge; Me': Al, B, P, Si, elements of groups 1, 2 and 3 of the periodic table, halogen; $0<x≤1$; $1≤y≤3$; $1≤z≤8$); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, and carbon-based negative electrode active materials such as crystalline carbon, amorphous carbon or carbon composite may be used alone or in combination of two or more.

If necessary, an electrode collector may be used.

The electrode current collector is a positive electrode current collector when the electrode is a positive electrode and a negative electrode current collector when it is a negative electrode.

The positive electrode current collector is not particularly limited as long as it has high conductivity without causing chemical changes in the relevant battery, and for example, stainless steel, aluminum, nickel, titanium, sintered carbon, or aluminum or stainless steel whose surface is treated with carbon, nickel, titanium, silver or the like may be used.

In addition, the negative electrode current collector is not particularly limited as long as it has electrical conductivity without causing chemical changes in the relevant battery. For example, copper, stainless steel, aluminum, nickel, titanium, sintered carbon; copper or stainless steel whose surface is treated with carbon, nickel, titanium, silver or the like; aluminum-cadmium alloy or the like may be used as the negative electrode current collector. In addition, the shape of the negative electrode current collector can be various forms such as a film having fine irregularities on a surface, sheet, foil, net, porous body, foam, nonwoven fabric and the like.

Examples of the conductive material may include nickel powder, cobalt oxide, titanium oxide, carbon, and the like. Examples of the carbon may include any one selected from the group consisting of Ketjen black, acetylene black, furnace black, graphite, carbon fiber and fullerene, or at least one of them.

Particularly, when the conductive material is the carbon fiber in the form of a fiber, the carbon fibers cannot be mixed uniformly in the slurry and the phenomenon to be agglomerated occurs more seriously than other conductive materials. However, even in such a case, it is possible to manufacture an electrode having a low porosity through the method proposed by the present invention.

The carbon fiber used as the conductive material may be at least one selected from the group consisting of polyacrylonitrile based carbon fiber, rayon based carbon fiber, pitch based carbon fiber, carbon nanotube, vapor grown carbon fiber (VGCF), carbon nano fiber (CNF), activated carbon nano fiber (ACNF), graphite fiber (chopped fiber), and combinations thereof, and preferably, the vapor grown carbon fiber is used.

The content of the conductive material is 0.5 to 20 parts by weight, preferably 3 to 10 parts by weight, based on 100 parts by weight of the active material. If the content is less than the above range, an appropriate improvement effect of the electric conductivity cannot be ensured, and the output characteristics and capacity of the battery are lowered. On the contrary, even if the content exceeds the above range, there is a possibility that the effect does not increase greatly or rather the battery characteristic is deteriorated. Therefore, the content is suitably adjusted within the above range.

The slurry in step (a) includes a polyimide-based high heat-resisting binder. In the present invention, it is possible to prevent the binder from being deteriorated or melted due to the heat generated in the process of melting the solid electrolyte and filling it into the pores of the electrode, by using the polyimide-based high heat-resisting binder.

The expression of high heat-resisting in the expression of the polyimide-based high heat-resisting binder refers to a level of 300 to 600° C., preferably a level of 400 to 600° C., more preferably a level of 450 to 600° C.

The polyimide-based high heat-resisting binder is not particularly limited as long as it is a high heat-resisting binder containing polyimide, but preferably may be at least one selected from the group consisting of polyimide-based high heat-resisting binder, polyamideimide-based high heat-resisting binder and combinations thereof. Specifically, the binder including a polyimide compound of the following formula (A) may be used:

[Formula A]

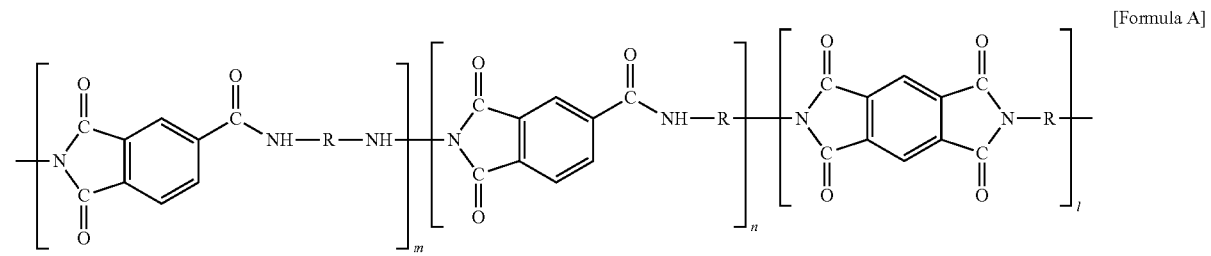

wherein R is alkyl or alkylene having 1 to 20 carbon atoms, and when R is at the terminal of formula (A), R is alkyl;

m is from 0 to 20, n is from 0 to 20, and l is from 0 to 20 wherein m+n+l≥1, that is, m, n and l may be integers of 0 or more, and any one of m, n and l is not necessarily zero.

In addition, the formula (A) may specifically be any one polyimide compound of the following formulas (1) to (3):

[Formula 1]

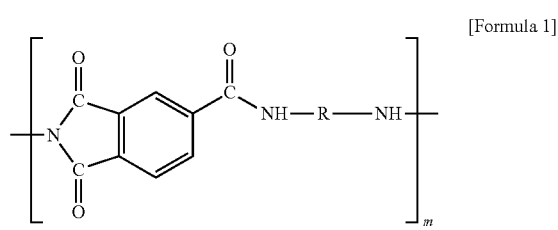

(in formula 1, R is alkylene having 1 to 20 carbon atoms, and m is 1 to 20),

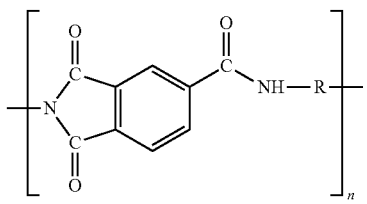

[Formula 2]

(in formula 2, R is alkyl or alkylene having 1 to 20 carbon atoms, and when R is at the terminal of formula 2, R is alkyl; and n is 1 to 20), and

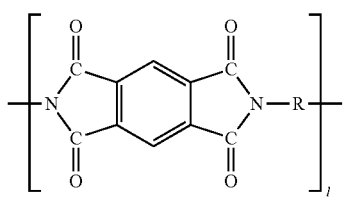

[Formula 3]

(In formula 3, R is alkyl or alkylene having 1 to 20 carbon atoms, and when R is at the terminal of formula 3, R is alkyl; 1 is 1 to 20).

The polyimide-based high heat-resisting binder may be included in an amount of 1 to 10 wt. % based on the total weight of the slurry. If the content of the polyimide-based high heat-resisting binder is less than the above range, there is a problem that the adhesive strength of the electrode is lowered. On the contrary, if the content exceeds the above range, there is a problem that the resistance in the electrode is increased.

The method for manufacturing the electrode for the all solid battery of the present invention includes a step of coating the electrode with the slurry containing the active material, the conductive material, and the polyimide-based high heat-resisting binder as described above.

The coating with the slurry may be applied in a thickness of 10 μm to 500 μm and then dried. The coating method may be selected from known methods in consideration of the characteristics of the material, or may be carried out by a new appropriate method. For example, it is preferable to uniformly disperse using a doctor blade or the like. In some cases, a method of performing the distribution and dispersion processes in a single process may be used. In addition, coating methods such as dip coating, gravure coating, slit die coating, spin coating, comma coating, bar coating, reverse roll coating, screen coating, cap coating and the like may be used In addition, the drying process can be appropriately selected on the basis of a conventional method which is used in the manufacture of an electrode.

Thereafter, the method for manufacturing the electrode for the all solid battery of the present invention includes the step of (b) placing a solid electrolyte having a melting temperature of 50° C. to 500° C. on the coating layer, followed by heating/melting it.

According to the present invention, since the solid electrolyte having a melting temperature of 50° C. to 500° C., preferably a melting temperature of 200° C. to 400° C., can be melted and impregnated into the pores in the coating layer of the electrode, there is an effect that the electron and ion transfer pathways can be well formed. Also, when the solid electrolyte is melted and impregnated into pores in the coating layer of the electrode, since the solid electrolyte can be brought into contact with the surface of the active material in a wetting manner, there is an effect that the bonding property of the active material/solid electrolyte is good and the interfacial resistance is lowered.

Specifically, the solid electrolyte usable in the present invention may comprise at least one selected from the group consisting of $Li_{3-x}ClO_{1-x}Hal_x$, $Li_{(3-x)}M_{x/2}OHal$, $Li_{3-2x}M_xO$-Hal, $Li_{(3-x)}N_{x/3}OHal1$ and $Li_2(OH)_{1-x}Hal1_xHal2$ (wherein M=Mg, Ca, Sr, Ba, Sr; N=trivalent metal; Hal=F, Br, I; Hal1, Hal2=F, Cl, Br, I; $0 \leq X \leq 1$).

The electrode for the all solid battery of the present invention includes a current collector; a coating layer formed on the current collector, which includes an active material, a conductive material and a polyimide-based high heat-resisting binder; and a solid electrolyte having a melting temperature of 50° C. to 500° C. formed on the coating layer.

In the case of the electrode for the all solid battery of the present invention, since the solid electrolyte is melted and applied on the coating layer as described in the above-mentioned manufacturing method, the molten solid electrolyte is impregnated into the pores in the coating layer of the electrode, and through this, the electron and ion transport pathways can be well formed In addition, as the molten solid electrolyte is impregnated into the pores of the coating layer of the electrode, the solid electrolyte is evenly contacted with the surface of the active material just as it is wetted to the surface, and the contact area forms a contact surface that is close to a surface contact like a liquid-solid interface, rather than a point contact like a solid-solid interface. Therefore, the bonding property between the active material and the solid electrolyte can be improved and the interfacial resistance can also be reduced.

In the electrode for the all solid battery of the present invention, the electrode may be a positive electrode or a negative electrode, and specific details thereof are as shown in the method of manufacturing the electrode for the all solid battery.

In the electrode for the all solid battery of the present invention, the conductive material may be one selected from the group consisting of nickel powder, cobalt oxide, titanium oxide, Ketjen black, acetylene black, furnace black, graphite, carbon fiber, fullerene and combinations thereof, and specific details thereof are as shown in the method of manufacturing the electrode for the all solid battery.

The polyimide-based high heat-resisting binder is not particularly limited as long as it is a high heat-resisting binder containing polyimide, but preferably may be at least one selected from the group consisting of polyimide-based high heat-resisting binder, polyamideimide-based high heat-resisting binder and combinations thereof. Specifically, the binder including a polyimide compound of the following formula (A) may be used:

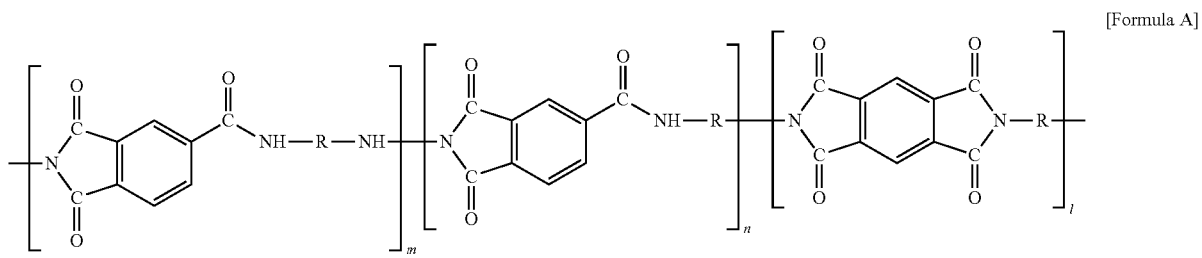

[Formula A]

wherein R is alkyl or alkylene having 1 to 20 carbon atoms, and when R is at the terminal of formula (A), R is alkyl;

m is from 0 to 20, n is from 0 to 20, and l is from 0 to 20 wherein m+n+l≥1, that is, m, n and l may be integers of 0 or more, and any one of m, n and l is not necessarily zero.

In addition, the formula (A) may be any one polyimide compound of the following formulas (1) to (3):

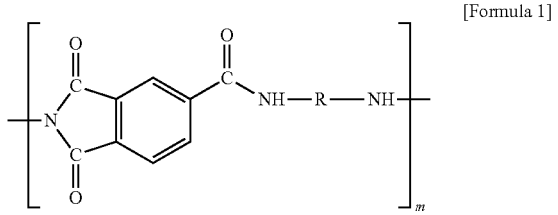

[Formula 1]

(in formula 1, R is alkylene having 1 to 20 carbon atoms, and m is 1 to 20),

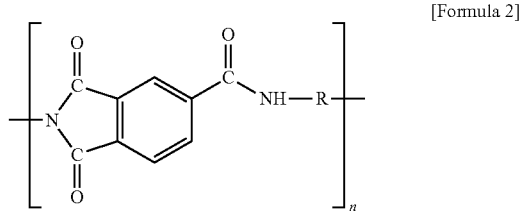

[Formula 2]

(in formula 2, R is alkyl or alkylene having 1 to 20 carbon atoms, and when R is at the terminal of formula 2, R is alkyl; and n is 1 to 20), and

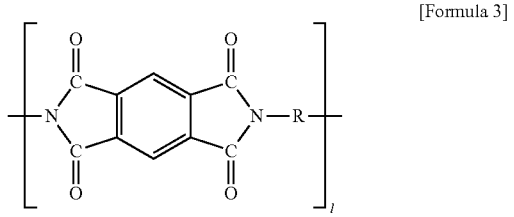

[Formula 3]

(In formula 3, R is alkyl or alkylene having 1 to 20 carbon atoms, and when R is at the terminal of formula 3, R is alkyl; l is 1 to 20).

The polyimide-based high heat-resisting binder may be contained in an amount of 0.5 to 10 wt. %, preferably 1.0 to 3 wt. %, based on the total weight of the electrode.

In the electrode for the all solid battery of the present invention, the solid electrolyte may preferably be a solid electrolyte having a melting temperature of 200° C. to 500° C. Specifically, the solid electrolyte may comprise at least one selected from the group consisting of $Li_{3-x}ClO_{1-x}Hal_x$, $Li_{(3-x)}M_{x/2}OHal$, $Li_{3-2x}M_xOHal$, $Li_{(3-x)}N_{x/3}OHal1$ and $Li_2(OH)_{1-x}Hal1_xHal2$ (wherein M=Mg, Ca, Sr, Ba, Sr; N=trivalent metal; Hal=F, Br, I; Hal1, Hal2=F, Cl, Br, I; 0≤X≤1).

The method for manufacturing the all solid battery using the electrode for the all solid battery having the above configuration is not particularly limited in the present invention, and a known method can be used.

When manufacturing the all solid battery of the present invention, if the electrode for the all solid battery of the present invention is used as a positive electrode, a normal negative electrode for an all solid battery may be used. If the electrode for the all solid battery of the present invention is used as a negative electrode, a normal positive electrode for an all solid battery may be used.

For example, a cell is assembled by placing an electrode and pressurizing and molding it.

The assembled cell is installed in the exterior material and then sealed by heat-pressurizing or the like. Laminate packs made of aluminum, stainless steel or the like, and cylindrical or square metal containers are very suitable for the exterior material.

Hereinafter, preferred embodiments of the present invention will be described in order to facilitate understanding of the present invention. However, it will be apparent to those skilled in the art that the following examples are merely illustrative of the invention, and various changes and modifications can be made within the scope and spirit of the invention, and it is to be understood that such variations and modifications are within the scope of the appended claims.

EXAMPLES: MANUFACTURE OF ELECTRODE AND ALL SOLID BATTERY

Example 1

An active material ($LiCoO_2$, 9 g), a conductive material (SuperP, 5 g) and a binder (LV042, polyimide, 5 g, Toray) were added to the mixer and placed it in a homogenizer and mixed at 3000 rpm for 30 minutes to prepare a slurry.

The slurry prepared above was applied to an electrode (Al, thickness: 20 μm) at a thickness of 200 vm and then dried under a vacuum oven at 130° C. for 12 hours to form a coating layer.

Thereafter, a solid electrolyte ($Li_{2.99}Ba_{0.005}OCl$, 5 g) was placed on the coating layer and heated/melted at 300° C. to manufacture an electrode for an all solid battery, which has a solid electrolyte layer formed on the coating layer, and its procedure is shown in FIG. 2. The cross section of the prepared electrode for the all solid battery was photographed using SEM/EDS, and the result is shown in FIG. 3. The yellow part of the photograph of the cross section of the electrode in FIG. 3 maps the element (Cl) contained in the meltable solid electrolyte and the red part shows the Al current collector, indicating that the meltable solid electrolyte is evenly impregnated into the interior (current collector part) of the electrode over all.

Thereafter, the electrode was used as a positive electrode, Li metal (150 μm) was used as a negative electrode, and the solid electrolyte layer (20 μm) was positioned as a separator layer between the positive electrode and the negative electrode to manufacture an all solid battery.

Example 2

An electrode for an all solid battery and an all solid battery were manufactured in the same manner as in Example 1, except for using a solid electrolyte (Li$_3$OCl, 5 g).

Example 3

An electrode for an all solid battery and an all solid battery were manufactured in the same manner as in Example 1, except for using SBU (5 g, Toray) as a binder Comparative Example 1

An electrode for an all solid battery and an all solid battery were manufactured in the same manner as in Example 1, except that no solid electrolyte layer was formed.

Comparative Example 2

An electrode for an all solid battery and an all solid battery were manufactured in the same manner as in Example 1, except for using PVDF-HFP as the binder.

Experimental Example 1: Evaluation of Electrode (Evaluation of Porosity)

The porosity was obtained by subtracting the density of the electrode obtained by collecting the electrode having an area of 1×1 cm$^2$ from 1, dividing the obtained value by the density obtained by excluding the electrode substrate from the electrode, and then converting it into a percentage, and the results are shown in table 1 below.

TABLE 1

|  | Porosity |
| --- | --- |
| Example 1 | 1.4% |
| Example 2 | 2.0% |
| Example 3 | 1.9% |
| Comparative Example 1 | ~30% |
| Comparative Example 2 | ~10% |

Experimental Example 2: Evaluation of Battery

The battery characteristics of the electrodes manufactured in Examples 1 to 3 and Comparative Examples 1 and 2 were confirmed, and the results are shown in table 2.

TABLE 2

|  | Charging/discharging capacity |
| --- | --- |
| Example 1 | 138 mAh/g |
| Example 2 | 125 mAh/g |
| Example 3 | 131 mAh/g |
| Comparative Example 1 | Not driven |
| Comparative Example 2 | 50 mAh/g |

Referring to table 2 above, it can be seen that the battery having the electrodes of Examples 1 to 3 according to the present invention has a charging/discharging capacity improved by at least 1.5 times to 3 times compared to those of Comparative Examples 1 and 2, due to low porosity.

The invention claimed is:

1. An electrode for an all solid battery comprising:
   a current collector;
   a coating layer formed on the current collector, which comprises an active material, a conductive material and a polyimide-based high heat-resisting binder, said polyimide-based binder having a melting temperature of 300° C. to 600° C.; and
   a solid electrolyte having a melting temperature of 50° C. to 500° C. formed on the coating layer,
   wherein the polyimide-based high heat-resisting binder comprises a polyimide compound of the following Formula A:

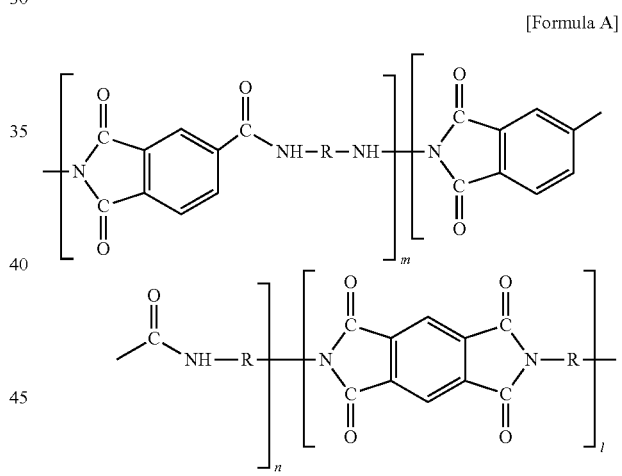

[Formula A]

wherein R is alkyl or alkylene having 1 to 20 carbon atoms, and when R is at a terminal of Formula A, R is alkyl;
m is from 0 to 20, n is from 0 to 20, and l is from 0 to 20 wherein m+n+l≥1.

2. The electrode for the all solid battery according to claim 1, wherein the solid electrolyte is impregnated into pores in the coating layer.

3. The electrode for the all solid battery according to claim 1, wherein the electrode is a positive electrode or a negative electrode.

4. The electrode for the all solid battery according to claim 1, wherein the active material is a positive electrode active material or a negative electrode active material for the all solid battery.

5. The electrode for the all solid battery according to claim 1, wherein the conductive material comprises one selected from the group consisting of nickel powder, cobalt oxide, titanium oxide, Ketjen black, acetylene black, furnace black, graphite, carbon fiber, fullerene, and combinations thereof.

6. The electrode for the all solid battery according to claim 1, wherein the polyimide-based high heat-resisting binder is contained in an amount of 0.5 to 10 wt. % based on a total weight of the electrode.

7. The electrode for the all solid battery according to claim 1, wherein the solid electrolyte has a melting temperature of 200° C. to 500° C.

8. The electrode for the all solid battery according to claim 1, wherein the solid electrolyte comprises at least one selected from the group consisting of $Li_{3-x}ClO_{1-x}Hal_x$, $Li_{(3-x)}M_{x/2}OHal$, $Li_{3-2x}M_xOHal$, $Li_{(3-x)}N_{x/3}OHal1$ and $Li_2(OH)_{1-x}Hal1_xHal2$ wherein M=Mg, Ca, Sr, Ba, or Sr; N=trivalent metal; Hal=F, Br, or I; Hal1, Hal2=F, Cl, Br, or I; $0 \leq X \leq 1$).

9. An all solid battery comprising the electrode of claim 1.

10. A method for manufacturing an electrode for an all solid battery according to claim 1, comprising the steps of:
(a) coating a current collector with a slurry comprising an active material, a conductive material, and a polyimide-based high heat-resisting binder, said polyimide-based binder having a melting temperature of 300° C. to 600° C.; and
(b) placing a solid electrolyte having a melting temperature of 50° C. to 500° C. on the coating layer, followed by heating and melting the solid electrolyte,
wherein the polyimide-based high heat-resisting binder comprises a polyimide compound of the following Formula A:

[Formula A]

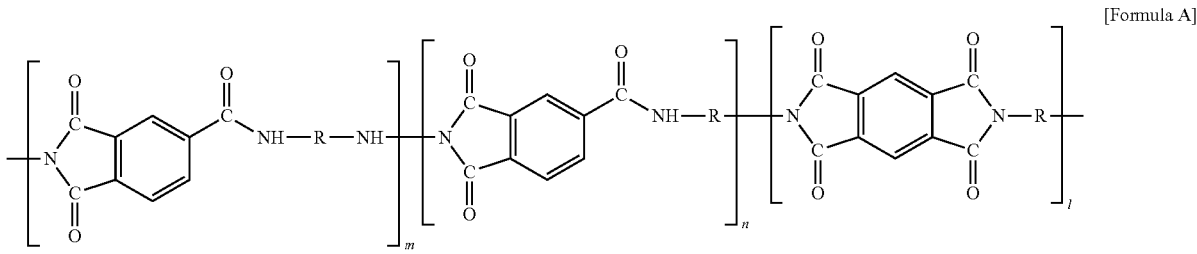

wherein R is alkyl or alkylene having 1 to 20 carbon atoms, and when R is at a terminal of Formula A, R is alkyl;
m is from 0 to 20, n is from 0 to 20, and 1 is from 0 to 20 wherein m+n+l≥1.

11. The method for manufacturing the electrode for the all solid battery according to claim 10, wherein the active material is a positive electrode active material or a negative electrode active material for the all solid battery.

12. The method for manufacturing the electrode for the all solid battery according to claim 10, wherein the conductive material comprises one selected from the group consisting of nickel powder, cobalt oxide, titanium oxide, Ketjen black, acetylene black, furnace black, graphite, carbon fiber, fullerene, and combinations thereof.

13. The method for manufacturing the electrode for the all solid battery according to claim 10, wherein the solid electrolyte has a melting temperature of 200° C. to 500° C.

14. The method for manufacturing the electrode for the all solid battery according to claim 10, wherein the solid electrolyte comprises at least one selected from the group consisting of $Li_{3-x}ClO_{1-x}Hal_x$, $Li_{(3-x)}M_{x/2}OHal$, $Li_{3-2x}M_xOHal$, $Li_{(3-x)}N_{x/3}OHal1$ and $Li_2(OH)_{1-x}Hal1_xHal2$ wherein M=Mg, Ca, Sr, Ba, or Sr; N=trivalent metal; Hal=F, Br, or I; Hal1, Hal2=F, Cl, Br, or I; $0 \leq X \leq 1$).

* * * * *